United States Patent [19]

Ohmori et al.

[11] Patent Number: 4,634,754

[45] Date of Patent: Jan. 6, 1987

[54] FLUORINE-CONTAINING COPOLYMER AND COMPOSITION CONTAINING THE SAME FOR CURING

[75] Inventors: Akira Ohmori, Ibaraki; Nobuyuki Tomihashi, Takatsuki; Yoshiki Shimizu, Settsu, all of Japan

[73] Assignee: Daikin Kogyo Co., Ltd., Osaka, Japan

[21] Appl. No.: 755,765

[22] Filed: Jul. 17, 1985

Related U.S. Application Data

[63] Continuation-in-part of Ser. No. 690,021, Jan. 9, 1985, abandoned.

[30] Foreign Application Priority Data

Jan. 10, 1984 [JP] Japan .................................. 59-2370

[51] Int. Cl.⁴ .............................................. C08F 14/18
[52] U.S. Cl. .................... 526/242; 526/245; 526/247; 526/253
[58] Field of Search ................ 526/242, 245, 253, 247

[56] References Cited

U.S. PATENT DOCUMENTS

| | | | |
|---|---|---|---|
| 3,444,148 | 5/1969 | Adelman | 526/242 |
| 4,138,426 | 2/1979 | England | 526/245 |
| 4,275,225 | 6/1981 | Krespan | 526/245 |
| 4,544,720 | 10/1985 | Ohmori et al. | 526/242 |
| 4,564,717 | 1/1986 | Ohmori et al. | 526/242 |

*Primary Examiner*—Harry Wong, Jr.
*Attorney, Agent, or Firm*—Armstrong, Nikaido, Marmelstein & Kubovcik

[57] ABSTRACT

A fluorine-containing copolymer comprising structural units of the formula (a):

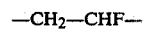

(a)

structural units of the formula (b):

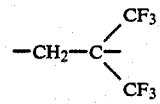

(b)

and structural units of the formula (c):

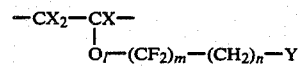

(c)

wherein X is —H or —F, Y is —OH, —COOH or

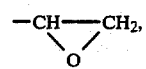

l is 0 or an integar of 1, m is 0 or an integar of 1 to 6 and n is 0 or an integer of 1 to 4, provided that Y is —COOH when n is 0. The copolymer has a good solubility to solvent and is cross-linkable, and the composition containing the copolymer can be cured at room temperature, and provides a film having an excellent chemical resistance, weatherability, stain resistance, heat resistance and high frictional electrification property.

3 Claims, No Drawings

FLUORINE-CONTAINING COPOLYMER AND COMPOSITION CONTAINING THE SAME FOR CURING

CROSS-REFERENCE TO RELATED APPLICATION

This is a continuation-in-part of application Ser. No. 690,021 filed on Jan. 9, 1985, and now abandoned.

BACKGROUND OF THE INVENTION

The present invention relates to a fluorine-containing copolymer which has a good solubility in solvents and is cross-linkable, and a curable composition containing the copolymer.

There hitherto have been well known room temperature curing paints which are prepared by dissolving a fluorine-containing copolymer in a solvent and admixing a curing agent, etc. (Japanese Unexamined Patent Publication No. 25414/1980, No. 34107/1982 and No. 34108/1982).

In general, fluoring-containing polymers prepared from only fluorine-containing monomers have a poor solubility in solvents. In the above-mentioned Japanese Unexamined Patent Publications, chlorotrifluoroethylene is copolymerized with hydrocarbon comonomers such as cyclohexyl vinyl ether to improve the solvent solubility. However, these fluorine-containing copolymers have the disadvantages that films obtained when used in paints are deficient in heat resistance, weatherability, stain resistance, chemical resistance, and the like.

An object of the present invention is to provide a fluorine-containing copolymer having a good solubility in solvents.

A further object of the present invention is to provide a cross-linkable fluorine-containing copolymer.

Another object of the present invention is to provide a composition containing the fluorine-containing copolymer which can be cured at room temperature.

SUMMARY OF THE INVENTION

In accordance with the present invention, there is provided a fluorine-containing copolymer comprising structural units of the formula (a):

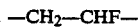   (a)

structural units of the formula (b):

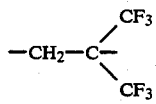   (b)

and structural units of the formula (c):

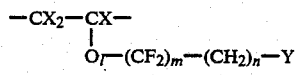   (c)

wherein X is —H or —F, Y is —OH, —COOH or

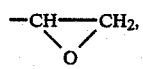, l is 0 or 1, m is 0 or an integer of 1 to 6 and n is 0 or an integer of 1 to 4, provided that Y is —COOH when n is 0. The present invention also provides a composition for curing comprising a fluorine-containing copolymer having 0 to 70% by mole of structural units of the formula (a), 20 to 70% by mole of structural units of the formula (b) and 0.5 to 30% by mole of structural units of the formula (c) and a curing agent.

DETAILED DESCRIPTION

In the present invention, the fluorine-containing copolymers are generally prepared by copolymerizing a monomer of the formula (a'):

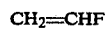   (a')

monomer of the formula (b'):

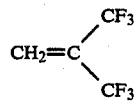   (b')

and a monomer of the formula (c'):

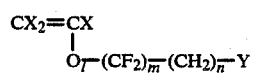   (c')

wherein X, Y, l, m and n are as defined above. The copolymers of the present invention usually have a molecular weight of 10,000 to 500,000 measured by gel permeation chromatography.

In case that the fluorine-containing copolymer of the present invention is employed as a room temperature curing paint, it is preferable that the copolymer contains 20 to 70% by mole of units of the monomer (a'), 20 to 70% by mole of units of the monomer (b') and 0.5 to 30% by mole of units of the monomer (c'). When both monomers of the formula (a') and formula (b') are included within the above range in the fluorine containing copolymer, it is excellent in weatherability and stain resistance of the paints. When the monomer of the formula (c') is included within the above range in the fluorine-containing copolymer, it is excellent in solubility in solvents and the curability of the copolymer.

Examples of the monomer of the formula (c') are, for instance, $CH_2=CHOCH_2CH_2OH$, $CH_2=CHO(CH_2)_3OH$, $CH_2=CHO(CH_2)_4OH$, $CH_2=CHO(CH_2)_5OH$,

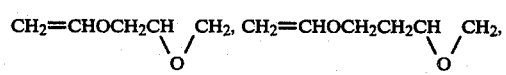

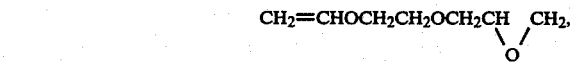

$CF_2=CFCH_2OH$, $CF_2=CFCF_2CH_2OH$, $CF_2=CFCF_2COOH$, $CF_2=CFCF_2CF_2CH_2CH_2OH$, $CF_2=CFCF_2CF_2CH_2COOH$ and the like, but the monomers are not limited to only such examples.

The fluorine containing copolymers may include further copolymerizable ethylenically unsaturated monomers, other than the monomers of the formula (a'), formula (b') and formula (c'). Examples of the other monomers are, for instance, $CF_2=CF_2$, $CClF=CF_2$, $CH_2=CF_2$, $CF_2=CFCF_3$, $CH_2=CHOR$ wherein R is an alkyl group having 1 to 6 carbon atoms, and the like.

Emulsion polymerization, suspension polymerization and solution polymerization are applied to the preparation of the fluorine-containing copolymers of the present invention. In any of the above polymerization processes, the polymerization is usually carried out at a temperature of 0° to 150° C., preferably 5° to 95° C., and under pressure of not more than 50 kg/cm²G.

Examples of the polymerization mediums are, for instance, water, 1,1,2-trichloro-1,2,2-trifluoroethane, 1,2-dichloro-1,1,2,2-tetrafluoroethane, mixtures thereof, and the like for the suspension polymerization, and methyl ethyl ketone, ethyl acetate, butyl acetate, and the like for the solution polymerization. Redox initiators comprising a persulfate as an oxidizing agent such as ammonium persulfate or potassium persulfate, a reducing agent such as sodium sulfite, and a transition metal salt such as ferrous sulfate are employed as a polymerization initiator in the emulsion polymerization. Azo compounds or organic peroxide compounds such as azobisisobutyronitrile, isobutyryl peroxide, octanoyl peroxide and di-isopropyl peroxydicarbonate are employed as a polymerization initiator in the suspension and solution polymerizations.

As an emulsifier used in emulsion polymerization, these are exemplified ammonium or sodium salts of perfluorocarboxylic acid, ω-hydroperfluorocarboxylic acid, and the like.

The fluorine-containing copolymers of the present invention have a better solubility in solvents in comparison with conventional fluorine-containing copolymers employed in room temperature curing paints, and the copolymers are readily dissolved in organic solvents, e.g. ketone solvents such as acetone, methyl ethyl ketone and methyl isobutyl ketone, ester solvents such as ethyl acetate, butyl acetate and cellosolve acetate, aprotic polar solvents such as tetrahydrofuran and N,N-dimethyl formamide, and the like.

The composition containing the fluorine-containing copolymer of the present invention is obtained by admixing the above fluorine-containing copolymers with a curing agent. Usually, these components are dissolved in the above-mentioned organic solvents and the compositions for curing are generally employed in a concentration of 5 to 50% by weight.

As the curing agents of the present invention, there can be employed compounds which react with —OH group, —COOH group,

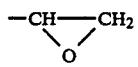

group, in the fluorine-containing copolymers, derived from the monomer of the formula (c') to crosslink the fluorine-containing copolymer. Examples of the curing agent are, for instance, Lewis acid compounds, amino compounds, amide compounds, imino compounds, epoxy compounds, isocyanate compounds, carboxylic anhydride, and the like.

In case that the functional group is carboxyl group, compounds having at least 2 amino, epoxy or isocyanate groups are generally employed as a curing agent. Examples of such a curing agent are, for instance, ethylenediamine, hexamethylenediamine, butylenediglycidylether,

hexamethylenediisocyanate trimer, trilene isocyanate, and the like. In case that the functional group is hydroxyl group, the above-mentioned isocyanate compounds, compounds having, at least 2 acid halides such as hexamethylenedicarboxyl chloride, and the like are employed as a curing agent. In case that the functional group is epoxy group are the above-mentioned compounds having amino group, Lewis acid such as $BF_3$, HCl,

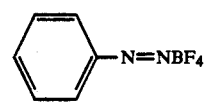

capable of producing $BF_3$ by photoirradiation, $BF_3 \cdot C_2H_5NH_2$ complex capable of producing $BF_3$ by heating, acid anhydride such as phthalic anhydride, amino resin pre-condensation product, methylol melamine resin, and the like are employed as a curing agent.

The curing agents which are gaseous at room temperature such as $BF_3$ are not generally added to the solutions of the fluorine-containing copolymers. They are utilized in such a manner that after applying the solution of the copolymer onto a substrate, the curing agents in a gaseous state are brought into contact with the resulting film of the fluorine-containing copolymers. Accordingly, the compositions containing the fluorine-containing copolymer of the present invention are those obtained by not only previously admixing the fluorine-containing copolymer with a curing agent, but also, after coating the fluorine-containing copolymer, bringing the fluorine-containing copolymer in contact with a gaseous curing agent.

The amount of the above curing agents is usually from 0.5 to 2 equivalents based on the functional group in the fluorine-containing copolymer of the invention.

It is possible to employ compounds employed as a general curing promoter when the fluorine-containing copolymer is cross-linked.

The cross-linking reaction of the copolymer is usually carried out at a temperature of 10° to 150° C. for several minutes to 2 weeks.

The composition for curing of the present invention may contain usual additives such as pigments, viscosity controllers, leveling agents, antigelling agents, ultraviolet absorbents, antiskining agent, and the like.

The composition containing the fluorine-containing copolymer of the present invention can be employed as exterior or interior paints for metal, wood, concrete, glass, plastics, etc., and provides a film having an excellent chemical resistance, weatherability, stain resistance and heat resistance. The compositions of the present invention have a volume resistivity of $10^{13}$ to $10^{17}$ Ωcm, a high frictional electrification property and a good stain resistance, and therefore the compositions of the present invention can be utilized as a carrier coating for an electron duplicator, i.e., an electrostatic process copying machine or plain paper copier.

The present invention is more specifically described and explained by means of the following Examples. It is to be understood that the present invention is not limited to the Examples, and various changes and modifications may be made in the invention without departing from the spirit and scope thereof.

EXAMPLE 1

A 1000 ml stainless autoclave was charged with 350 ml of an ion-exchanged water and 1 g of sodium carbonate. After the autoclave was sealed, the space in the autoclave was displaced with nitrogen gas to remove oxygen. The inner pressure of the autoclave was reduced to 30 mmHg and 180 ml of trichlorotrifluoroethane was introduced into the autoclave. Thereafter, 65 g of

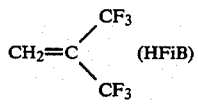

and 25 g of CH$_2$=CHF (VF) were added in order into the autoclave from separate bombs under autogenous pressure. The autoclave was heated to 40° C., and then 10 ml of trichlorotrifluoroethane solution in which 1 g of di-isopropyl peroxydicarbonate as an initiator was dissolved was added into the autoclave under pressure of nitrogen, and then 1 g of CH$_2$=CHO(CH$_2$)$_4$OH (HBVE) was added into the autoclave by using a pump, and thereafter polymerization reaction was started. The pressure within the autoclave was 7.5 kg/cm$^2$G. In the course of polymerization, pressure within the autoclave was constantly maintained at 7.5 kg/cm$^2$G while continuously feeding VF into the autoclave. One gram of HBVE was added into the autoclave at every 2 g of VF consumed in polymerization of HBVE and VE from a pump. The polymerization was carried out at the above-mentioned temperature for 8 hours with agitation.

After the polymerization was completed, the reaction mixture was added dropwise to petroleum ether with agitation to precipitate the copolymer dissolved in the reaction mixture. The copolymer was dried in a vacuum dryer (80° C.) for 16 hours to give 52 g of the copolymer of the present invention.

The obtained copolymer had an intrinsic viscosity [Δ] of 0.278 dl/g in methyl ethyl ketone at 35° C., a thermal decomposition temperaure of 275° C. [at that temperature, the reduction of weight begins, and the temperature was determined at a heating rate of 10° C./min in air by a differential thermal balance], a glass transition temperature of 75° C. [at that temperature heat absorption begins, and the temperature was determined by a differential scanning calorimeter at a heating rate of 20° C./min], a hydroxyl value of 46 mg KOH/g [the value was determined according to JIS K 0070], and a molecular weight of 10,000 to 500,000 [the value was determined by GPC (column: joined column of Shodex A-803, A850 and A806, solvent: N,N-dimethylformamide, measurement condition: room temperature, standard sample: polystyrene)]. The result of the 19F nuclear magnetic resonance analysis (NMR) is shown in Table 1 and the elementary analysis is shown in Table 2.

TABLE 1

| 19F NMR (External standard: CF$_3$COOH, hereinafter the same) | | |
|---|---|---|
| Chemical shift δ (ppm) | Assignment (under line) | Signal intensity ratio |
| 7 to 9.5 | —C$\underline{F_3}$ | 6.6 |
| −99 | —C$\underline{H}$F— | 1.0 |

TABLE 2

| Elementary analysis | | |
|---|---|---|
| | Calcd. (%) | Found (%) |
| C | 36.6 | 36.3 |
| H | 3.1 | 3.0 |
| F | 57.7 | 56.8 |

From the results of the above hydroxyl value, 19F NMR and elementary analysis, it was confirmed that the obtained polymer was a copolymer of VF, HFiB and HBVE in a molar ratio of 43.4:47.7:8.9.

EXAMPLE 2

A 1000 ml stainless autoclave was charged with 350 ml of an ion exchanged water and 1 g of sodium carbonate. After the autoclave was sealed, the space in the autoclave was displaced with nitrogen gas to remove oxygen. The inner pressure of the autoclave was reduced to 30 mmHg and 180 ml of trichlorotrifluoroethane was introduced into the autoclave. And thereafter, 14 g of CF$_2$=CFCF$_2$CH$_2$OH (M5FP) was added through a pump and VF was added from a bomb under autogenous pressure. The autoclave was heated to 40° C., and then 10 ml of trichlorotrifluoroethane solution in which 1 g of di-isopropyl peroxydicarbonate as an initiator was dissolved was added into the autoclave under pressure of nitrogen, and thereafter polymerization reaction was started. The pressure within the autoclave was 5 kg/cm$^2$G. In the course of polymerization, pressure within the autoclave was constantly maintained at 5 kg/cm$^2$G while continuously introducing liquid mixed monomers of VF, HFiB and M5FP in a molar ratio of 48:47:5 into the autoclave from a bomb. Five milliliters of initiator solution having a concentration equal to the above-mentioned initiator solution was added into the autoclave at every 10 hours. The polymerization was carried out for 25 hours.

After the polymerization was completed, aftertreatments in Example 1 were repeated to give 31 g of the fluorine-containing copolymer.

The obtained copolymer had a [Δ] of 0.321 dl/g, a thermal decomposition temperature of 281° C. and a glass transistion temperature of 63° C. The [Δ], thermal decomposition temperature and glass transition temperature were determined in the same manner as in Example 1.

The result of 19F NMR is shown in Table 3 and the result of elementary analysis is shown in Table 4.

TABLE 3

| 19F NMR | | |
|---|---|---|
| Chemical shift δ (ppm) | Assignment (under line) | Signal intensity ratio |
| 7 to 9.5 | —C$\underline{F_3}$ | 13.6 |
| −30 to −45 | —C$\underline{F_2}$CF—<br>    |<br>CF$_2$CH$_2$OH | 1.0 |
| | —C$\underline{H}$F— | |

TABLE 3-continued

| Chemical shift δ (ppm) | $^{19}$F NMR Assignment (under line) | Signal intensity ratio |
| --- | --- | --- |
| −99 to −105 | or<br>—CF$_2$CF—<br>\|<br>CF$_2$CH$_2$OH | 2.6 |

TABLE 4

| | Elementary analysis | |
| --- | --- | --- |
| | Calcd. (%) | Found (%) |
| C | 34.1 | 33.8 |
| H | 2.4 | 2.3 |
| F | 62.75 | 62.3 |

From the results of the above $^{19}$F NMR and elementary analysis, it was confirmed that the obtained polymer was a copolymer of VF, HFiB and M5FP in a molar ratio of 48.8:46.1:5.1.

EXAMPLE 3

The polymerization (for 9 hours) and aftertreatment were carried out in the same manner as in Example 1 except that glycidyl vinyl ether (GVE) was employed instead of HBVE to give 48 g of a copolymer.

The obtained copolymer had a [Δ] of 0.341 dl/g, a thermal decomposition temperature of 277° C., a glass transition temperature of 71° C. and an epoxy value of 55 mg KOH/g (referred to "Kobunshi kogakukoza" Vol. 8, pages 444 to 445, edited by Kobunshi Gakkai and published by Chizin Shokan). The result of $^{19}$F NMR is shown in Table 5 and the result of elementary analysis is shown in Table 6.

TABLE 5

| Chemical shift δ (ppm) | $^{19}$F NMR Assignment (under line) | Signal intensity ratio |
| --- | --- | --- |
| 7 to 9.5 | —CF$_3$ | 6.5 |
| −99 | —CHF— | 1.0 |

TABLE 6

| | Elementary analysis | |
| --- | --- | --- |
| | Calcd. (%) | Found (%) |
| C | 36.5 | 36.1 |
| H | 2.6 | 2.4 |
| F | 57.5 | 57.2 |

From the results of the above epoxy value, $^{19}$F NMR and elementary analysis, it was confirmed that the obtained polymer was a copolymer of VF, HFiB and GVE in a molar ratio of 43.0:46.6:10.4.

EXAMPLE 4

After a 1000 ml stainless autoclave was sealed, the space in the autoclave was displaced with nitrogen gas to remove oxygen. And further 500 g of 1,2-dichloro-1,1,2,2-tetrafluoroethane and 100 g of CF$_2$=CFCF$_2$COOH (FBA) were added in order into the autoclave, and the autoclave was heated until 40° C. The pressure within the autoclave was 2 kg/cm$^2$G. Thereafter, mixed monomers wherein the molar ratio of VF HFiB is 48:52 were fed into the autoclave until 2.2 kg/cm$^2$G of pressure within the autoclave. 10 ml of trichlorofluoroethane solution in which 1 g of di-isopropyl peroxydicarbonate as an inititator was dissolved was added into the autoclave under pressure of nitrogen, and thereafter polymerization reaction was started. In the course of polymerization, pressure within the autoclave was constantly maintained at 2.2 kg/cm$^2$G while continuously feeding the above mixed monomers into the autoclave, and 5 ml of initiator solution having a concentration equal to the above-mentioned initiator solution was added at ever 10 hours. After the polymerization was carried out for 26 hours, unreacted monomers and dichlorotetrafluoroethane were liberated, and after-treatment was carried out in the same manner as in Example 1 to give 18 g of a copolymer.

The obtained copolymer had a [Δ] of 0.205 dl/g, a thermal decomposition temperature of 274° C. and a glass transition temperature of 65° C. The result of $^{19}$F NMR is shown in Table 7, and result of elementary analysis is shown in Table 8.

TABLE 7

| Chemical shift δ (ppm) | $^{19}$F NMR Assignment (under line) | Signal intensity ratio |
| --- | --- | --- |
| 7 to 9.5 | —CF$_3$ | 15.3 |
| −30 to −45 | —CF$_2$CF—<br>\|<br>CF$_2$COOH | 1.0 |
| | —CHF— | |
| | or | |
| −99 to −105 | —CF$_2$CF—<br>\|<br>CF$_2$COOH | 2.6 |

TABLE 8

| | Elementary analysis | |
| --- | --- | --- |
| | Calcd. (%) | Found (%) |
| C | 33.5 | 33.1 |
| H | 2.2 | 2.3 |
| F | 63.0 | 62.6 |

From the results of the $^{19}$F NMR and elmentary analysis, it was confirmed that the obtained polymer was a copolymer of VF, HFiB and FBA in a molar ratio of 45.8:49.7:4.5.

EXAMPLE 5

The procedures in Example 1 were repeated until 10 ml of trichlorotrifluoroethane solution was added into the autoclave, and thereafter 30.5 g of CF$_2$=CFCF$_2$CF$_2$CH$_2$CH$_2$OH (7FHA) and 13 g of VF were added. The autoclave was heated to 40° C. And then 10 ml of trichlorotrifluoroethane solution in which 1 g of di-isopropyl peroxydicarbonate as an initiator was dissolved was added into the autoclave, and thereafter polymerization reaction was started.

The pressure within the autoclave was 5 kg/cm$^2$G. In the course of polymerization, pressure within the autoclave was constantly maintained at the above pressure while continuously feeding liquid mixed monomers of VF, HFiB and 7FHA in a molar ratio of 46:44:10 into the autoclave, and 5 ml of initiator solution having an equal concentration to the above-mentioned initiator solution was added at every 10 hours. The polymerization was carried out for 15 hours.

After the polymerization was completed, aftertreatment was carried out in the same manner as in Example 4 to give 59 g of a copolymer.

The obtained copolymer had a [Δ] of 0.256 dl/g, a thermal decomposition temperature of 285° C. and a glass transition temperature of 63° C. The result of $^{19}F$ NMR is shown in Table 9, and the result of elementary analysis is shown in Table 10.

TABLE 9

| Chemical shift δ (ppm) | $^{19}F$ NMR Assignment (under line) | Signal intensity ratio |
|---|---|---|
| 7 to 9.5 | —C$\underline{F_3}$ | 26.3 |
| —30 to —45 | —C$\underline{F_2}$CF—<br>\|<br>CF$_2$CF$_2$C$_2$H$_4$OH | 6.1 |
| —99 | —CH$\underline{F}$— | 4.5 |
| —130 to —135 | —CF$_2$C$\underline{F}$—<br>\|<br>CF$_2$CF$_2$C$_2$H$_4$OH | 1.0 |

TABLE 10

| | Elementary analysis | |
|---|---|---|
| | Calcd. (%) | Found (%) |
| C | 33.9 | 33.5 |
| H | 2.4 | 2.2 |
| F | 62.35 | 61.8 |

From the results of the above $^{19}F$ NMR and elementary analysis, it was confirmed that the obtained polymer was a copolymer of VF, HFiB and 7FHA in a molar ratio of 45.5:44.3:10.2.

EXAMPLES 6 to 10

The copolymers obtained in Examples 1 to 5 were dissolved into methyl ethyl ketone so as to be 20% by weight, and curing agents shown in Table 11 were respectively added into the above methyl ethyl ketone solution and were sufficiently mixed. (In case of BF$_3$, gaseous BF$_3$ comes to contact with the coating film.)

The obtained solutions were employed in the following tests.

(a) The solutions were applied onto a fluorine-containing resin film of a thickness of 100 μm (made by Daikin Kogyo Co., Ltd.; NEOFLON NF-100) corona-discharged at 200 W/m$^2$ by a knife edge electrode by a barcoater having a spacer of 1 mm in thickness. After the coatings were cured by the method shown in Table 11, the coatings were peeled off from the fluorine-containing resin film, and the transmittance of the obtained coating films (0.2 mm in thickness) was measured.

(b) The solutions were applied onto steel plates, having a thickness of 0.5 mm, treated with zinc phosphate (made by Nippon Test Panel Co., Ltd.; BN 144 treated steal plate) by a barcoater having a clearance of 100 μm. After the films were cured by the above-mentioned method, the pencil hardness, cross-cut test, flexibility and stain resistance of the film were measured. The results of these tests are shown in Table 11. The pencil hardness, cross-cut-test, flexibility and stain resistance were curried out as follows:

Pencil hardness: The method of JIS K5401-69.

Cross-cut-test: The film was cut by a cutter to form 100 squares each having a size of 1×1 mm and the procedure of adhesion-peeling off of cellophane adhesive tape was repeated 10 times. The number of remaining squares are shown in Table 11.

Flexibility: The above films were bent at an angle of 90° along a steel bar of 1 mmφ, 2 mmφ, 3 mmφ or 4 mmφ. The smallest diameters having no crack on the film are shown in Table 11.

Stain resistance: The surface of the film was written 5 lines having 0.5 cm of width and 3 cm of length by a red or black dry ink marker. After the film was allowed to stand for 3 days, the film was wiped by a cloth soaked in methanol. The appearance of the surfaces is shown in Table 11.

TABLE 11

| Example | Used co-polymer | Curing agent | Amount of curing agent (g) | Curing condition | Transmittance (%) | | | | Pencil hardness | Cross-cut test | Flexibility (mmφ) | Stain resistance |
|---|---|---|---|---|---|---|---|---|---|---|---|---|
| | | | | | 400 nm | 500 nm | 600 nm | 700 nm | | | | |
| 6 | Example 1 | Hexamethylene diisocyanate trimer | 1.6 | 30° C. 7 days | 88.7 | 90.1 | 91.1 | 91.3 | 4H | 100 | 2 | No remain |
| 7 | Example 2 | Hexamethylene diisocyanate trimer | 1.0 | 30° C. 7 days | 85.2 | 88.7 | 89.0 | 89.0 | 3H | 92 | " | No remain |
| 8 | Example 3 | BF$_3$ gas | 0.1 | 30° C. 4 hours | 87.5 | 90.2 | 91.5 | 91.4 | 4H | 100 | " | No remain |
| 9 | Example 4 | Hexamethylene diamine | 0.3 | 30° C. 1 day | 75.2 | 78.2 | 78.8 | 80.1 | 3H | 95 | " | No remain |
| 10 | Example 5 | Hexamethylene diisocyanate trimer | 1.8 | 30° C. 7 days | 86.7 | 88.8 | 89.6 | 90.2 | 3H | 93 | " | No remain |

What we claim is:

1. A fluorine-containing copolymer comprising 20 to 70% by mole of structural units of the formula (a):

—CH$_2$—CHF—     (a)

20 to 70% by mole of structural units of the formula (b):

and 0.5 to 30% by mole of structural units of the formula (c):

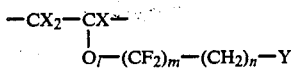

wherein X is —H or —F, Y is —OH, —COOH or

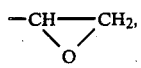

l is 0 or 1, m is 0 or an integer of 1 to 6 and n is 0 or an integer of 1 to 4, provided that Y is —COOH when n is 0 and provided that m and n are not both zero when l is 1.

2. The copolymer of claim 1, wherein the molecular weight of the popolymer is from 10,000 to 500,000 when measured by a gel permeation chromatography.

3. The copolymer of claim 1, which further contains as ethylenically unsaturated monomer unit other than said units (a), (b) and (c).

* * * * *